(12) United States Patent
Mendik et al.

(10) Patent No.: US 8,082,500 B2
(45) Date of Patent: Dec. 20, 2011

(54) METHOD AND APPARATUS FOR COMMUNICATING WITH AN INTELLIGENT ELECTRONIC DEVICE ASSOCIATED TO A SWITCHING DEVICE IN POWER SYSTEMS

(75) Inventors: Michael Mendik, Jeannette, PA (US); Anton Poeltl, Hempfield, PA (US)

(73) Assignee: ABB Technology AG, Zurich (CH)

( * ) Notice: Subject to any disclaimer, the term of this patent is extended or adjusted under 35 U.S.C. 154(b) by 623 days.

(21) Appl. No.: 12/192,413

(22) Filed: Aug. 15, 2008

(65) Prior Publication Data

US 2009/0055740 A1 Feb. 26, 2009

Related U.S. Application Data

(60) Provisional application No. 60/956,989, filed on Aug. 21, 2007.

(51) Int. Cl.
*G06F 15/00* (2006.01)
*G06F 13/00* (2006.01)
(52) U.S. Cl. ......................................... 715/705; 715/707
(58) Field of Classification Search .................. 715/709, 715/763, 765, 853, 700, 705, 707, 708, 715, 715/810, 851
See application file for complete search history.

(56) References Cited

U.S. PATENT DOCUMENTS

| | | | |
|---|---|---|---|
| 5,629,869 A | 5/1997 | Johnson et al. | |
| 5,636,134 A | 6/1997 | Johnson et al. | |
| 5,638,296 A | 6/1997 | Johnson et al. | |
| 2003/0140332 A1* | 7/2003 | Norton et al. | 717/106 |
| 2006/0116794 A1* | 6/2006 | Stoupis et al. | 700/286 |

* cited by examiner

*Primary Examiner* — Cao "Kevin" Nguyen
(74) *Attorney, Agent, or Firm* — Michael C. Prewitt; Robert P. Nupp

(57) ABSTRACT

A method and apparatus for communicating with an intelligent electronic device coupled to a switching device used in a power system, wherein a user-interface software program operates on a computing device which is operatively connected to the intelligent electronic device. The user-interface software program when executed by the processor of the computing device provides a plurality of wizards selectable by a user. Upon selecting a wizard to be executed, the user-interface software program causes the display on a monitor of a first window displaying wizard controls for guiding a user in the execution of one or more steps related to the selected wizard, and a second window separate from the first window displaying information related to the step under execution.

15 Claims, 9 Drawing Sheets

METHOD AND APPARATUS FOR COMMUNICATING WITH AN INTELLIGENT ELECTRONIC DEVICE ASSOCIATED TO A SWITCHING DEVICE IN POWER SYSTEMS

CROSS REFERENCE TO RELATED APPLICATION

This application claims the priority of U.S. provisional patent application Ser. No. 60/956,989 filed on Aug. 21, 2007, entitled "Method and Apparatus for Communicating with an Intelligent Electronic Device Associated to a Switching Device in Power Systems" the contents of which are relied upon and incorporated herein by reference in their entirety, and the benefit of priority under 35 U.S.C. 119(e) is hereby claimed.

BACKGROUND OF THE INVENTION

The present invention relates to a method and apparatus for communicating between a computing device and an intelligent electronic device (IED) associated with a switching device used in a power system.

In recent years, the use of intelligent electronic devices (IEDs) in power systems has increased. More and more IEDs are used for control and/or monitoring of associated switching devices, such as circuit breakers. An IED by definition is a microprocessor-based device, typically a controller relay, with at least one communications port. The communications port is used to communicate with a computing device operated by a user, for example to download data or change settings. To this end, dedicated user-interface software to be installed on the computing device is delivered with the IED. This software usually has features that allow users to edit settings or display data by means of tables and/or graphics.

Since users deal with a variety of different IEDs devised for different purposes and provided from different manufacturers, the amount of new information that needs to be absorbed by users becomes overwhelming. Due to the absence of applicable standards, a manufacturer of IEDs needs to ensure that the product is as much as possible user-friendly, by reducing the amount of a prior knowledge required to the user in order to work with the IED supplied and to set it for proper operations either during pre-installation phases, e.g. factory set-up or commissioning, or when the IED is installed in service, e.g. during data download or for alarm resolution purposes.

For example, commissioning of an IED that controls and/or monitors a circuit breaker is non-trivial. In addition of reviewing and possibly changing the settings of the IED, the circuit breaker also needs to be operated and certain actions need to be taken depending on the data that was collected during the operation. A traditional type of user-interface software provides step-by-step instructions only as part of the help function or the instruction book. The user is expected to shift his focus between software on the one hand and separate instructions on the other hand many times before the task is completed. This is cumbersome and error-prone. In addition to the user losing time over a cumbersome procedure, there is a risk that the commissioning process is left incomplete or with configuration errors. This may result in sub-optimal performance of the IED, false alarms or even failure of the IED to perform its intended function. This in turn leads to downtime of the primary equipment and more resources to be invested on behalf of the user.

Further, once an IED is in service, it is expected to perform without problems. If problems occur, there are chances that the operator sent to investigate the problem is not familiar with the specific IED because of the increasing variety of IEDs used in power system. If the user obtains technical support from the IED manufacturer, the manufacturer will often request a data download. Downloading data stored on the IED is the first step to troubleshooting but it may also be the first stumbling block. Indeed, different IEDs require different user-interface software differing in the actions to be taken to obtain a data download. Typical data downloads involve opening of a communications channel, requesting the data stored on the IED and saving the data to a file. Opening of the communication channel may depend on the communications ports available on the user's computer, such as Ethernet, USB, RS232 etc., and communications parameters, e.g. network parameters, baud rates etc. The menu picks and data entries or selections that have to be made in order to perform a data download may not be obvious to the user and valuable time is lost searching the documentation for help.

The user may also attempt troubleshooting directly. Again, because of the increasing variety of IEDs used, the user may not be familiar with the IED and the interpretation of the data stored on the IED becomes non-trivial. Valuable time may be lost studying documentation. In addition loss of revenues may occur if the problem is of such severity that a circuit breaker outage is required.

Therefore, in the situations described above, a simpler, faster and less error-prone solution is desirable in order to perform the required tasks. This solution is provided by the method and apparatus of the present invention.

SUMMARY OF THE INVENTION

In accordance with the present invention, there is provided a system for communicating with an intelligent electronic device suitable to be operatively coupled to a switching device used in a power system, comprising:

at least one computing device which is operatively connected to said intelligent electronic device and comprises a monitor, a memory, and a processor; and a user-interface software program instruction which is stored in said memory and when executed by the processor provides a plurality of wizards selectable by the user, wherein, upon selecting a wizard to be executed, said user-interface software program instruction causes the display on said monitor of a first window displaying wizard controls for guiding a user in the execution of one or more steps related to the selected wizard, and a second window separate from said first window displaying information related to the step under execution.

Also provided in accordance with the present invention is a method for communicating between an intelligent electronic device suitable to be operatively coupled to a switching device used in a power system and at least one computing device which is operatively connected to said intelligent electronic device, said at least one computing device comprising a monitor, a processor, a memory, and a user-interface software program instruction stored in said memory which, when executed by the processor, provides a plurality of wizards selectable by a user, the method comprising the following steps;

a) selecting a wizard to be executed among said plurality of wizards;

b) displaying on said monitor a first window displaying wizard controls for guiding a user in the execution of one or more steps related to the selected wizard and a second window separate from said first window displaying information related to the step under execution.

The present invention also provides a computer readable medium for communicating between an intelligent electronic device suitable to be operatively coupled to a switching device used in a power system and at least one computing device which is operatively connected to said intelligent electronic device, said at least one computing device comprising a monitor, and a processor, said computer-readable medium having computer-readable instructions stored thereon which, when executed by said processor, provides a plurality of wizards selectable by a user, wherein, upon selecting a wizard to be executed, said computer-readable instructions cause the display on the monitor of a first window displaying wizard controls for guiding a user in the execution of one or more steps related to the selected wizard, and a second window separate from said first window displaying information related to the step under execution.

BRIEF DESCRIPTION OF THE DRAWINGS

The features, aspects, and advantages of the present invention will become better understood with regard to the following description, appended claims, and accompanying drawings where:

DETAILED DESCRIPTION OF ILLUSTRATIVE EMBODIMENTS

Figure 1:
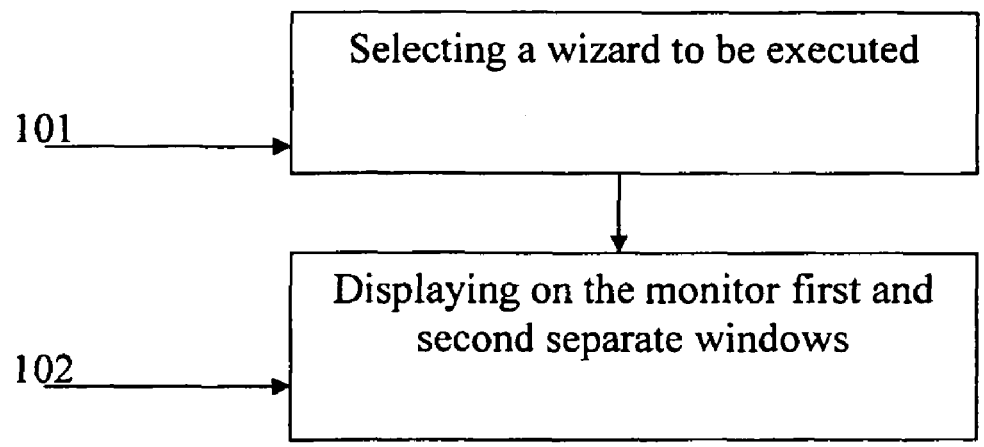
FIG. 1 is a flow chart illustrating a method for communicating between an IED suitable to be operatively coupled to a switching device used in a power system and a computing device which is operatively connected to the IED in accordance to the present invention.

It should be noted that in the detailed description that follows, identical or functionally equivalent components have the same reference numerals, regardless of whether they are shown in different embodiments of the present invention. It should also be noted that in order to clearly and concisely disclose the present invention, the drawings may not necessarily be to scale and certain features of the invention may be shown in somewhat schematic form.

Figure 2:
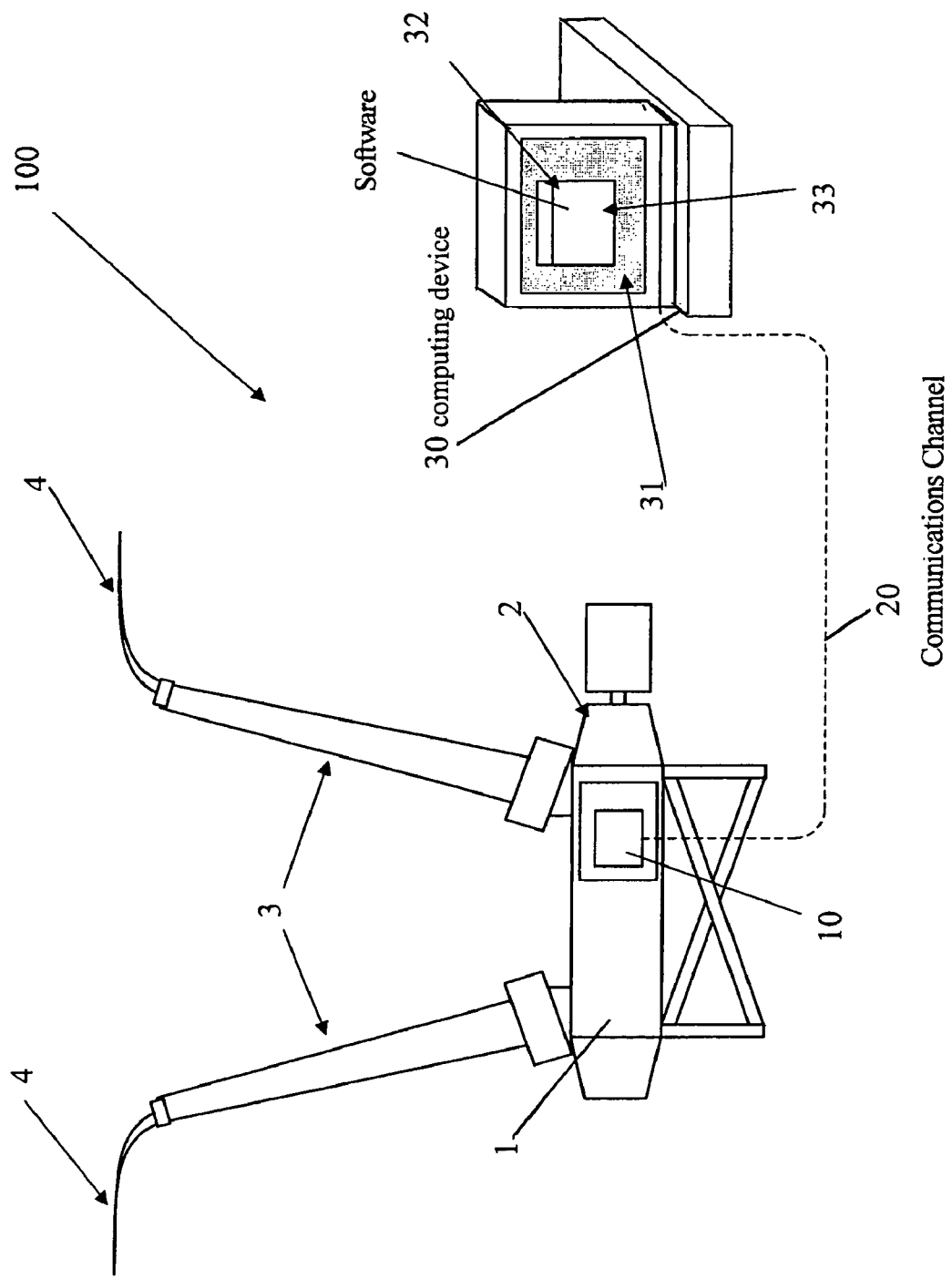
FIG. 2 is a view schematically illustrating system for communicating with an intelligent electronic device suitable to be operatively coupled to a switching device used in a power system according to the present invention.

FIG. 2 schematically illustrates an example of a power system comprising a high-voltage apparatus which is indicated by the overall reference number 100 and is operatively coupled to an associated three-phase power line 4. The apparatus 100 comprises a switching device 1 which in the exemplary embodiment illustrated is represented by a high-voltage switchgear 1 having a casing 2 connected to two bushings 3. Each bushing 3 houses an electrical terminal for input/output connections with the power line 4. Inside the casing 2 there is positioned a high voltage interrupter which comprises a pair of separable contacts. According to solutions well known in the art and therefore not described herein in detail, during switching operations the contacts of the interrupter are switched between a first position where they are coupled to each other and a second position where they are instead separated.

The illustrated apparatus 100 comprises an intelligent electronic device (IED) 10 which is operatively coupled to the high-voltage switchgear 1. The IED 10 is a processor-based electronic device provided with one or more communications port and configured so as to allow monitoring and/or control of the associated switchgear 1, and in particular of its interrupter. An example of a suitable IED 10 is the ABB Switching Control Sentinel (SCS), or the ABB Synchronous Control Unit (SCU). However, it would be appreciated by those skilled in the art that other suitable IEDs available on the market could be used, such as synchronous switching IEDs, on-line condition monitoring IEDs, IEDs suitable for reporting circuit breaker status and/or perform control functions, etc.

The system according to the invention comprises at least one computing device 30 which is operatively connected to the IED through a communications channel 20. The communications channel 20 is operatively connected to the communications port of the IED 10 and can be of any suitable type, either wired or wireless, optical etc.

The computing device 30 comprises a monitor 31, a memory 32, and a processor 33. The computing device 30, as well as its various components such as the monitor 31, the memory 32 and the processor 33 can be of any type available on the market and suitable for the operation of the present invention. For example, the computing device 10 can be a laptop or a desktop computer.

Figure 6:
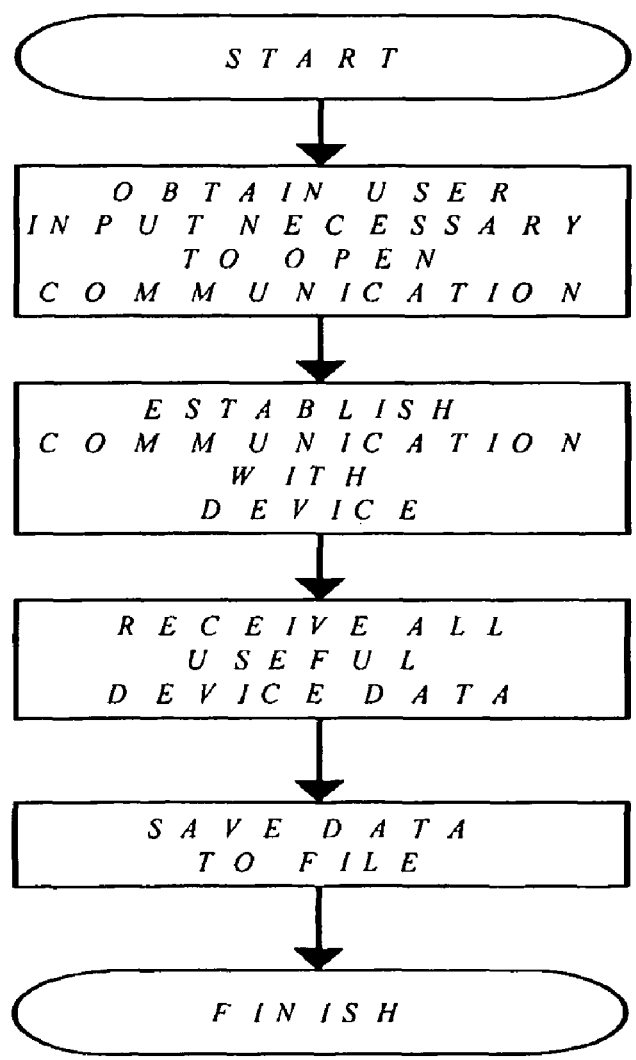
FIG. 6 is an exemplary flow chart outlining a data download wizard according to the present invention.
Figure 5:
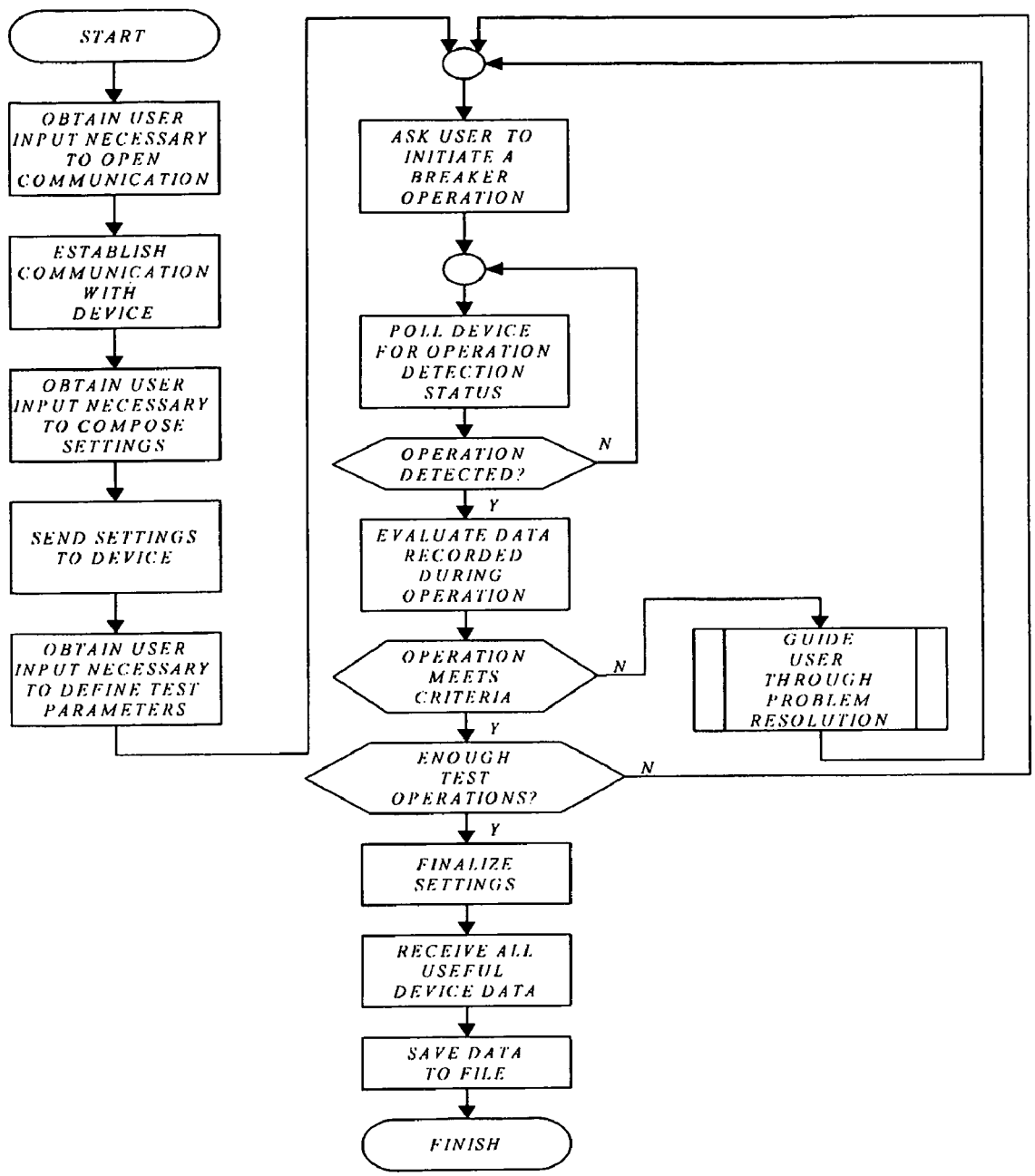
FIG. 5 is an exemplary flow chart outlining the wizards for commissioning and factory set-up & test according to the present invention.
Figure 7:
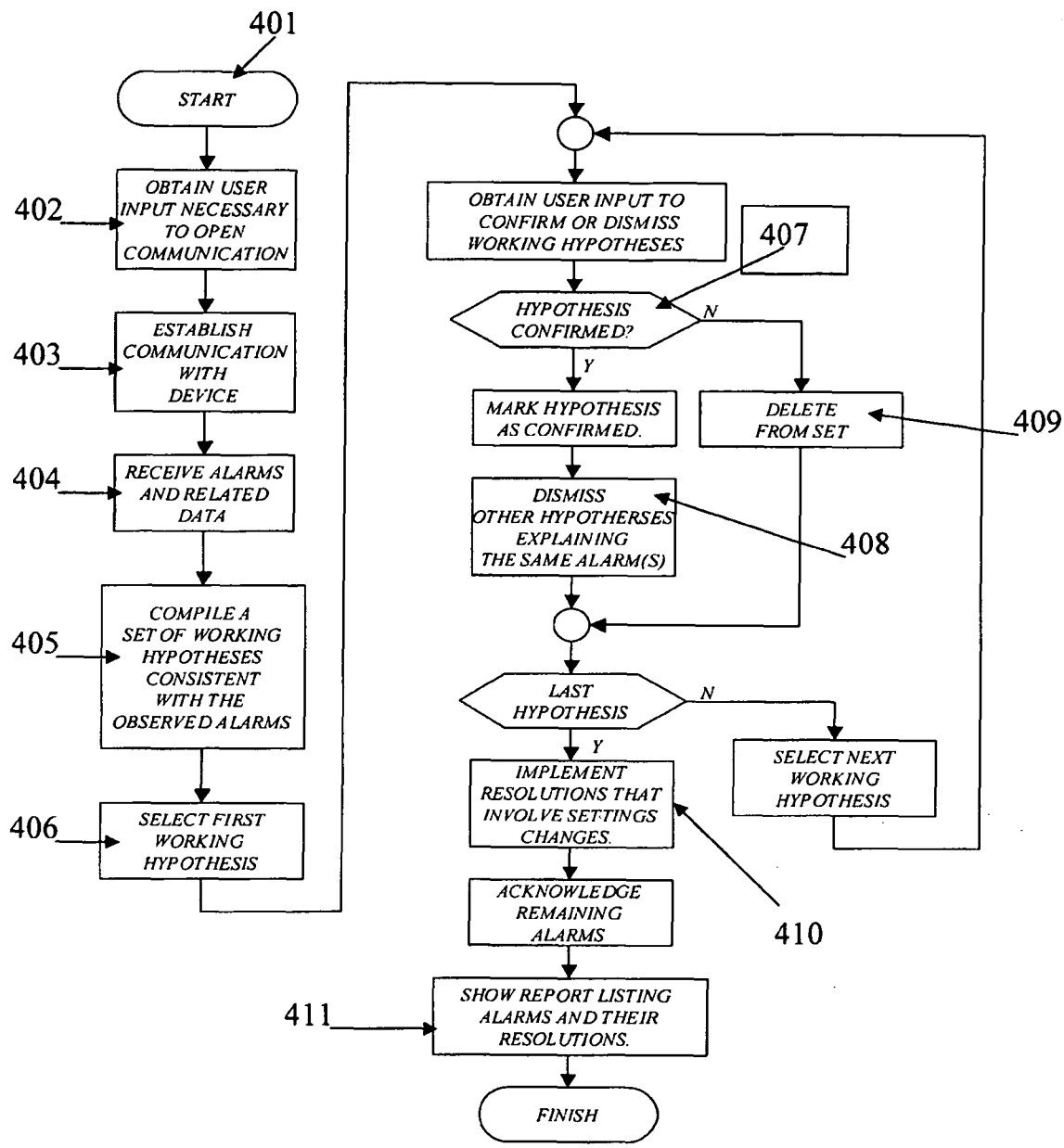
FIG. 7 is an exemplary flow chart outlining the wizard for alarm resolution according to the present invention.

The system and method according to the invention foresees the use of a user-interface software program instruction which is stored in the memory 32 and when executed by the processor 33 provides a plurality of wizards selectable by a user. In particular, in the system and method according to the invention, the user-interface software program instruction, when executed by the processor 33, provides a user with a factory set-up and test wizard, a commissioning wizard, a data download wizard, and an alarm resolution wizard. FIG. 5 is an exemplary flow chart outlining the wizard for commissioning as well as the wizard for factory set-up & test. The two wizards differ in a level of detail not shown in FIG. 5. For instance, the factory set-up & test wizard may include low-level settings and the commissioning wizard may include interrupter operations under high-voltage conditions. FIG. 6 outlines the data download wizard. The use of such a wizard makes this process simpler and faster. The greatest benefit arises when the user intends to use the data to obtain technical support rather than attempting to directly interpret the data. FIG. 7 shows a flow chart outlining the wizard for alarm resolution. Depending on the applications and/or specific needs, other wizards can be added, or some of the above indicated wizards can be excluded.

Figure 3:
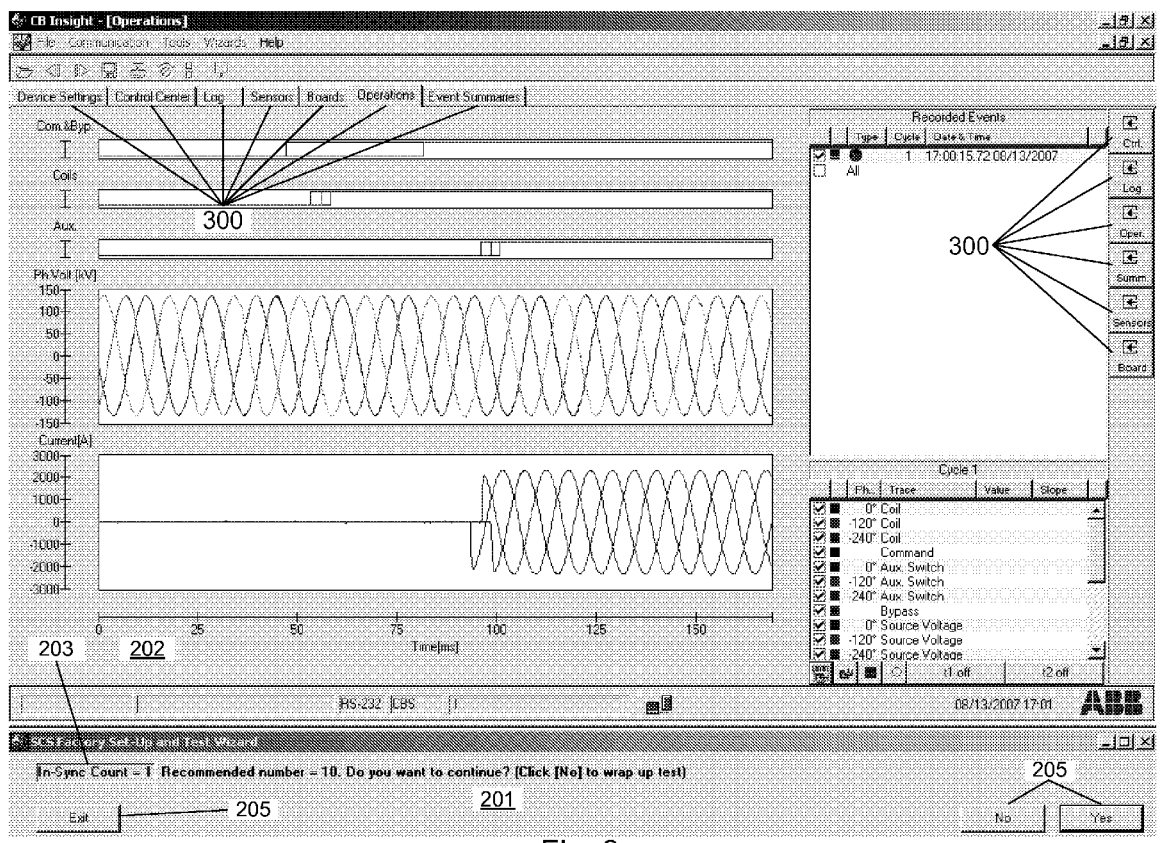
FIG. 3 shows an example of the user-interface software used in the apparatus and method according to the invention with a selected wizard being at a specific step.

As indicated in FIGS. 1, 3, and 8-10, when a user first selects a wizard to be executed at step 101, then at step 102 the user-interface software program instruction causes the display on the monitor 31 of a first window 201 and of a second window 202 which are separate from each other. As illustrated, the user-interface software program instruction causes the display on the monitor 31 of the two windows 201 and 202 in such a way that they do not obstruct or overlap to each other, wherein the first windows 201 displays wizard controls for guiding the user in the execution of one or more steps related to the selected wizard, while the second window 202 displays information related to the step under execution. For example, as illustrated in FIG. 3, when the step under execution within the selected wizard factory set-up & test is the evaluation of the synchronism of a closing or opening operation of the interrupter with respect to the power line 4, the second window 202 shows the waveform of that operation.

In addition, the user-interface software program instruction causes the appearance of the first window 201 and of the second window 202 displayed on the monitor 31 to change depending on the wizard selected. The displayed appearance can change also during execution of one or more steps within the same selected wizard with the wizard controls displayed in the first window 201 varying also from step to step, as illustrated in FIGS. 3, 8-10.

Figure 9:
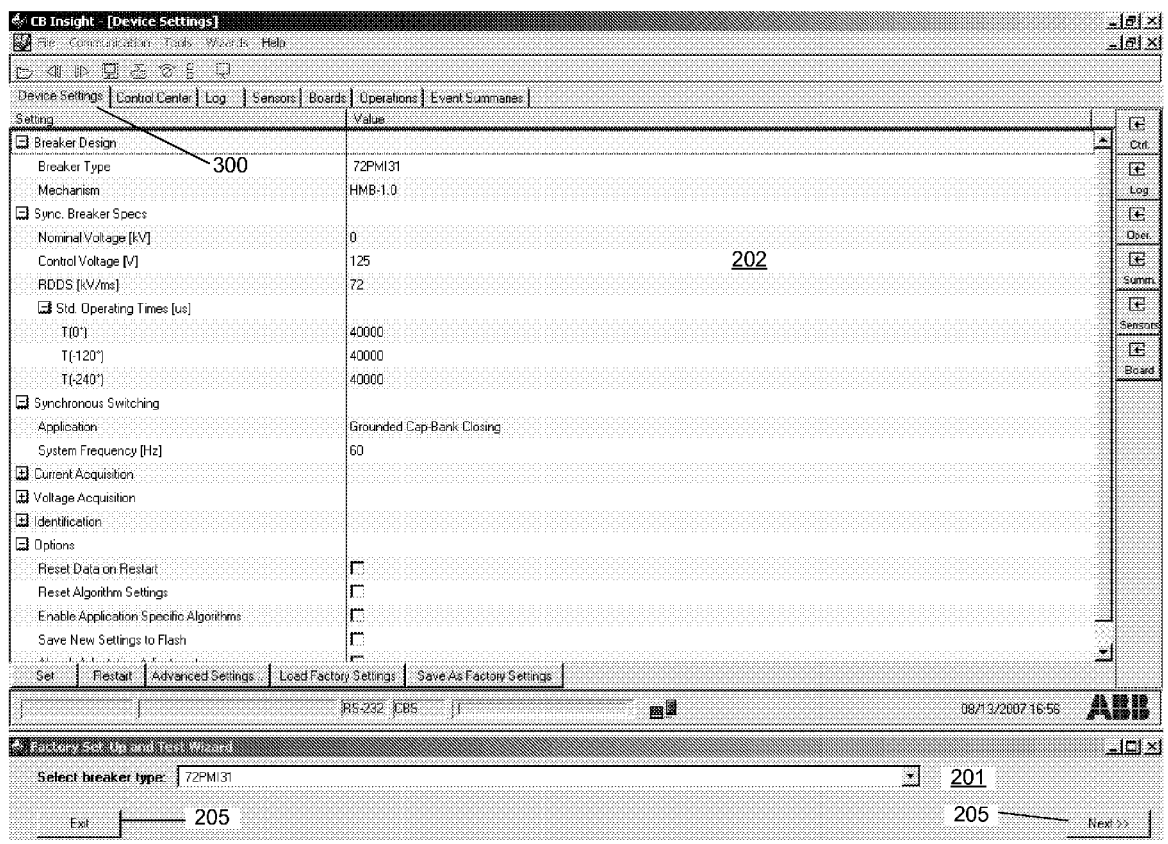

In particular, when one or more steps related to the selected wizard are executed by a user, the user-interface software program instruction causes the display in the second window 202 of one or more controls, such as the tabs 300 of FIG. 3, of the second window 202 itself which are available to the user in parallel to the wizard controls displayed in the first window 201. In this way, while the selected wizard guides the user step by step through the process of performing a specific task, the main second window 202 displays not only information that is relevant in the context of the present step but allows the user to operate also with the controls of the second window 202 itself. For example, as represented in FIG. 9, by clicking on the control tab 300 "device setting" some information either related or not to the step under execution appear in the main second window 202. The user can then click on any of the values in the right hand column of the main window 202, for example the RDDS (rate of decrease of dielectric strength) value of 72, and an edit line would appear allowing the user to edit this value. Likewise, the user can also switch to a different window appearance by clicking on another of the seven tab controls 300, for example the control "Sensors", or the buttons on the bottom "Set", "Restart" etc., or the control buttons on the right hand side, indicated "Ctrl.", "Log", "Oper." etc. The user can also place markers and step through the various traces, selectively show some and suppress others, or zoom in.

Figure 4:
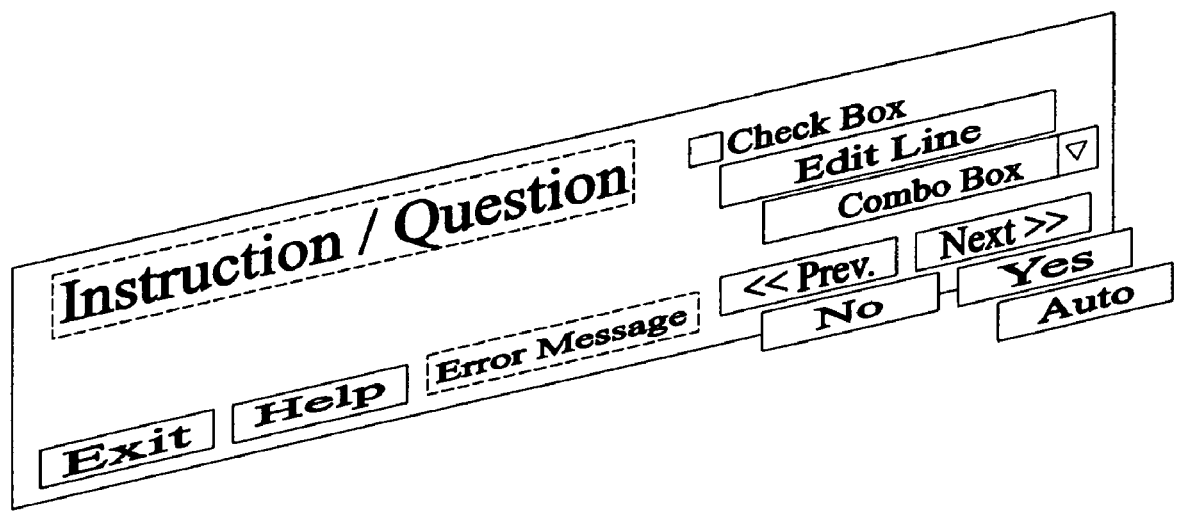
FIG. 4 illustrates an example of a possible anatomy of a wizard window.

FIG. 4 illustrates an exemplary anatomy of the first window 201 where the wizard controls are displayed. The controls appearing in the wizard first window 201 can be formed by any combination of the controls shown in FIG. 4 as well as others depending on the wizard and related step under execution, i.e. text messages, instructions, queries, buttons, for example a "Next>>" button to advance to the next wizard screen, a "<<Prev." button to return to the previous wizard screen, a "Yes" button and a "No" button to answer a question affecting the flow of the wizard, i.e. which steps will be executed next, check boxes for binary data entries, combination boxes for data entries comprising a selection of pre-defined values, an edit line for alpha-numerical data entries, a text containing an error message in case a step was not completed successfully, or any combination thereof.

Figure 8:
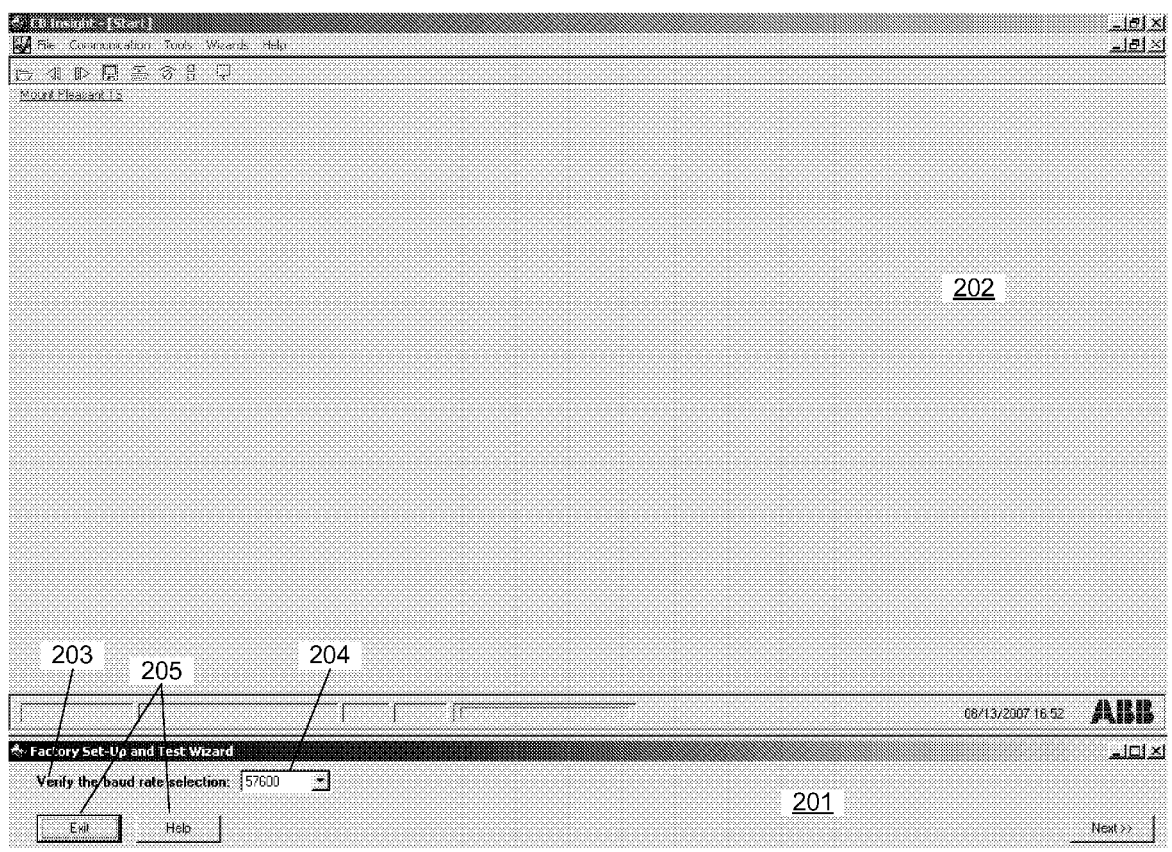
FIGS. 8-10 show illustrates some examples of screenshots obtained according to the method and system according to the present invention.
Figure 10:
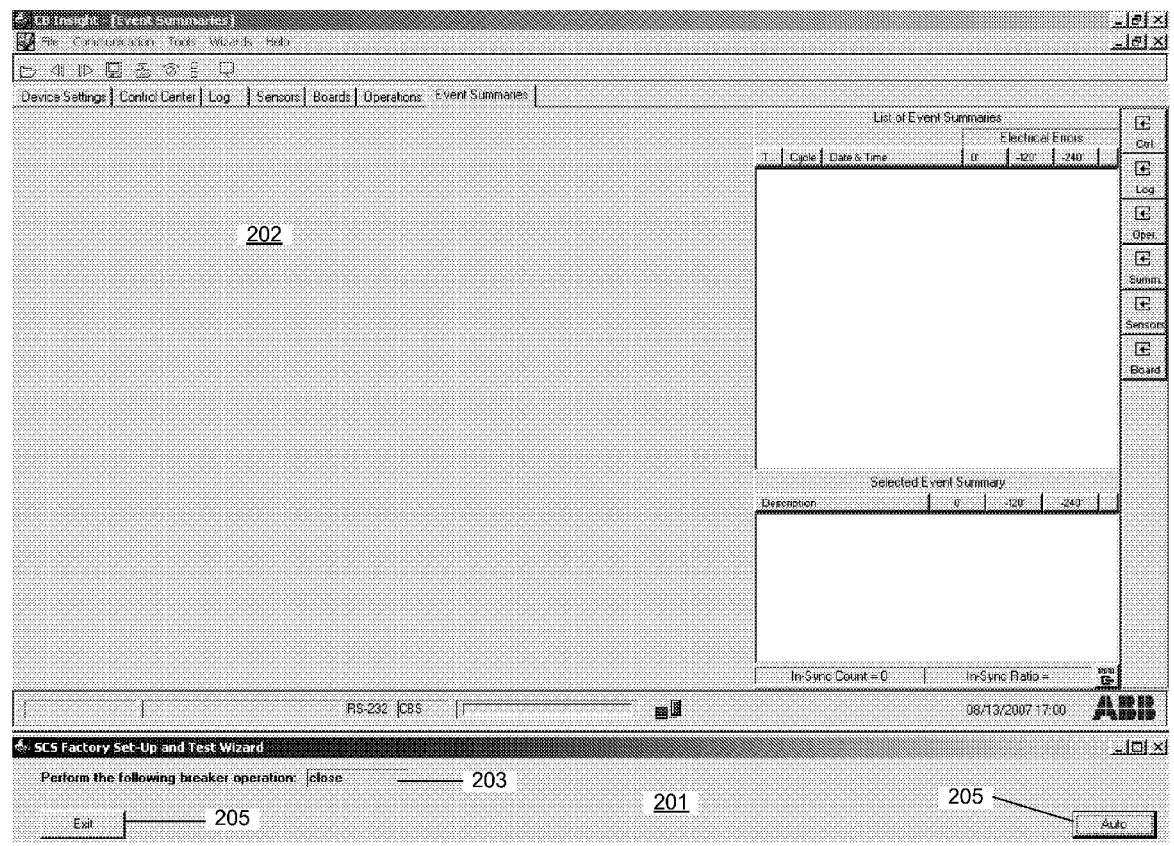

For example, FIG. 8 shows wizard controls which are constituted by an instruction 203 "Verify the baud rate selection", a combination box 204 showing the figure 57600, and three buttons 205 ("Exit", "Help", "Next"). On the other hand, FIG. 10 shows wizard controls constituted by an instruction 203 ("Perform the following breaker operation"), and two buttons 205 ("Exit" and "Auto"). In particular, the "Auto" button 205 is a wizard control which is conceived so that when displayed in the first window 201—it indicates to the user that the wizard is not waiting for a user-input but for an external condition detectable by the IED 10. Clicking on the "Auto" button brings up a message reminding the user of this fact. For example, an external condition is the availability of a recorded operation on the IED 10.

One further advantageous aspect of the present invention resides in the use of the alarm resolution wizard in situations where the cause for an alarm or different types of alarms issued by the IED 10 and related to the operation of the switching device 1 is not obvious. In such a situation an alarm can have several possible causes. Furthermore, two or more alarms could have the same root cause. In this case as schematically indicated in FIG. 7, once the user has selected the alarm resolution wizard (step 401), the wizards asks the user (402) which comport he is using to connect to the IED 10 and then guides the user step-by-step through opening communication (403) and downloading relevant data (404). Once this is done the wizard proceeds to the actual process of alarm resolution. The alarm resolution wizard revolves around a set of working hypotheses each explaining at least one of the alarms. In particular, the wizard compiles a set of working hypotheses (step 405) which are displayed in the second window 202 and are suitable for identifying the cause of the one or more alarms issued. To confirm or dismiss a specific hypothesis a user input is required. This could involve checking gauges, verifying wiring or other information accessible to the user but not the IED 10. Once a hypothesis is first selected (step 406) and then confirmed (step 407), it explains one or more alarms. Other hypotheses that were considered to explain the same alarms can automatically be dismissed (step 408). If the first selected hypothesis is not confirmed, it is deleted (step 409) and the steps are repeated with the next available hypothesis. At the end, the root cause for every alarm can be identified. In case an alarm can be resolved by settings changes these can be done by the alarm resolution wizard (step 410). The wizard can also send the updated settings to the IED 10. Some root causes may require repairs or other user interventions not under control of the wizard and/or IED. Until the root cause is removed the associated alarms can at least be acknowledged. Finally, the alarm resolution wizard displays (step 411) in the second window 202 a report with each alarm, its root cause and its resolution.

Thanks to the system and method of the present inventions, users can save valuable time and reduce the risk of mistakes during commissioning of an IED that could result in costly outages later on. It is also possible to save valuable time during downloading of data from the IED by an inexperienced user who is seeking technical support from the manufacturer. Furthermore, it is possible to empower even an inexperience user to resolve alarms generated by the IED not just by clearing them but also by determining the root cause. In addition, the manufacturer also saves valuable time during factory set-up and test with a reduced risk of making mistakes during this process which otherwise could also result in field problems.

As will be appreciated by one of ordinary skill in the art, the present invention may be embodied as or take the form of the method and system previously described, as well as of a computer readable medium having computer-readable instructions stored thereon which, when executed by a processor, carry out the operations of the present inventions as previously described and defined in the corresponding appended claims. The computer-readable medium may be any medium that can contain, store, communicate, propagate, or transport the user-interface program instruction for use by or in connection with the instruction execution system, apparatus, or device and may by way of example but without limitation, be an electronic, magnetic, optical, electromagnetic, infrared, or semiconductor system, apparatus, device, or propagation medium or other suitable medium upon which the program is printed. More specific examples (a non-exhaustive list) of the computer-readable medium would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Computer program code or instructions for carrying out operations of the present invention may be written in any suitable programming language provided it allows achieving the previously described technical results.

It is to be understood that the description of the foregoing exemplary embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. A system for communicating with an intelligent electronic device suitable to be operatively coupled to a switching device used in a power system, comprising:
    at least one computing device which is operatively connected to said intelligent electronic device and comprises a monitor, a memory, and a processor; and
    a user-interface software program instruction which is stored in said memory and when executed by the processor provides a plurality of wizards selectable by the user, wherein the plurality of wizards comprises two or more wizards selected from the group consisting of a factory set-up and test wizard, a commissioning wizard, a data download wizard, and an alarm resolution wizard, and wherein upon selecting a wizard to be executed, said user-interface software program instruction causes the display on said monitor of a first window displaying wizard controls for guiding a user in the execution of one or more steps related to the selected wizard, and a second window separate from said first window displaying information related to the step under execution and one or more controls of the second window which are available to the user in parallel to said wizard controls displayed in the first window.

2. The system of claim 1 wherein said user-interface software program instruction causes the appearance of said first window and the second window displayed on said monitor to change depending on the wizard selected or during execution of said one or more steps of the selected wizard.

3. The system of claim 1 wherein, when one or more alarms related to the operation of said switching device are issued by said intelligent electronic device, upon selection by the user of said alarm resolution wizard, said user-interface software program instruction causes the display in said second window of a set of working hypotheses suitable for identifying the root of the one or more alarms issued and requiring user input for selecting one of set working hypotheses.

4. The system of claim 3 wherein said user-interface software program instruction causes the display in said second window of a report related to each of said one or more alarms issued.

5. The system of claim 1 wherein said user-interface software program instruction causes the display on said first window of a control for indicating to the user that the selected wizard is not waiting for a user-input but for an external condition.

6. A method for communicating between an intelligent electronic device suitable to be operatively coupled to a switching device used in a power system and at least one computing device which is operatively connected to said intelligent electronic device, said at least one computing device comprising a monitor, a processor, a memory, and a user-interface software program instruction stored in said memory which, when executed by the processor, provides a plurality of wizards selectable by a user, wherein the plurality of wizards comprises two or more wizards selected from the group consisting of a factory set-up and test wizard, a commissioning wizard, a data download wizard, and an alarm resolution wizard, the method comprising the following steps:
    a) selecting a wizard to be executed among said plurality of wizards;
    b) displaying on said monitor a first window displaying wizard controls for guiding a user in the execution of one or more steps related to the selected wizard and a second window separate from said first window displaying information related to the step under execution and one or more controls of the second window which are available to the user in parallel to said wizard controls displayed in the first window.

7. The method of claim 6, wherein said step b) comprises causing the appearance of the first window and the second window displayed on said monitor to change depending on the wizard selected or during execution of said one or more steps of the selected wizard.

8. The method of claim 6, wherein step a) further comprises selecting the alarm resolution wizard when one or more alarms related to the operation of said switching device are issued by said intelligent electronic device, and step b) further comprises displaying in said second window a set of working hypotheses suitable for identifying the root of one or more alarms issued and requiring user input for selecting one of said working hypotheses.

9. The method of claim 8 wherein step b) further comprises displaying in said second window a report related to each of said one or more alarms issued.

10. The method of claim 6, wherein step b) further comprises displaying on said first window a control for indicating to the user that the selected wizard is not waiting for a user-input but for an external condition.

11. In a system for communicating between an intelligent electronic device suitable to be operatively coupled to a switching device used in a power system and at least one computing device which is operatively connected to said intelligent electronic device, said at least one computing device comprising a monitor, and a processor, a computer-readable medium having computer-readable instructions stored thereon which, when executed by said processor, provides a plurality of wizards selectable by a user, wherein the plurality of wizards comprises two or more wizards selected from the group consisting of a factory set-up and test wizard, a commissioning wizard, a data download wizard, and an alarm resolution wizard, wherein upon selecting a wizard to be executed, said computer-readable instructions cause the display on the monitor of a first window displaying wizard controls for guiding a user in the execution of one or more steps related to the selected wizard, and a second window separate from said first window displaying information related to the step under execution and one or more controls of the second window which are available to the user in parallel to said wizard controls displayed in the first window.

12. The computer readable medium of claim 11, wherein it comprises computer-readable instructions stored thereon which cause the appearance of the first window and the second window displayed on said monitor to change depending on the wizard selected or during execution of said one or more steps of the selected wizard.

13. The computer readable medium of claim 11, wherein it comprises computer-readable instructions stored thereon which—when one or more alarms related to the operation of said switching device are issued by said intelligent electronic device and upon selection by the user of said alarm resolution wizard, cause the display in said second window of a set of working hypotheses suitable for identifying the root of the one or more alarms issued and requiring user input for selecting one of set working hypotheses.

14. The computer readable medium of claim 13, wherein it comprises computer-readable instructions stored thereon which cause the display in said second window of a report related to each of said one or more alarms issued.

15. The computer readable medium of claim 11, wherein it comprises computer-readable instructions stored thereon which cause the display on said first window of a control for indicating to the user that the selected wizard is not waiting for a user-input but for an external condition.

* * * * *